United States Patent
Mirov et al.

(10) Patent No.: US 9,170,112 B2
(45) Date of Patent: Oct. 27, 2015

(54) MOBILE DEVICE POSITION AND ORIENTATION FROM MULTIPLE UNSURVEYED MAGNETIC SOURCES

(71) Applicant: Google Inc., Mountain View, CA (US)

(72) Inventors: Russell Norman Mirov, Los Altos, CA (US); Andrew Lookingbill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 13/762,575

(22) Filed: Feb. 8, 2013

(65) Prior Publication Data

US 2014/0229103 A1    Aug. 14, 2014

(51) Int. Cl.
| | |
|---|---|
| *G01C 21/00* | (2006.01) |
| *G01C 21/08* | (2006.01) |
| *G01C 21/20* | (2006.01) |
| *G01S 5/02* | (2010.01) |

(52) U.S. Cl.
CPC .............. *G01C 21/08* (2013.01); *G01C 21/206* (2013.01); *G01S 5/0252* (2013.01)

(58) Field of Classification Search
CPC ...................................................... G01C 21/00
USPC ......... 701/408, 409, 430, 449, 451, 454, 472, 701/525
See application file for complete search history.

(56) References Cited

U.S. PATENT DOCUMENTS

| | | | |
|---|---|---|---|
| 4,710,708 A | 12/1987 | Rorden et al. | |
| 4,816,634 A | 3/1989 | Lentz et al. | |
| 5,576,973 A | 11/1996 | Haddy | |
| 6,249,246 B1 | 6/2001 | Bode et al. | |
| 6,686,881 B1 | 2/2004 | Lu et al. | |
| 7,395,966 B2 | 7/2008 | Braiman | |
| 7,463,907 B2 | 12/2008 | Smith et al. | |
| 8,359,344 B2 | 1/2013 | Das et al. | |
| 8,593,282 B2 | 11/2013 | Scarola et al. | |
| 8,600,341 B2 | 12/2013 | Johnson | |
| 8,781,739 B1 | 7/2014 | Miller | |
| 8,855,671 B1 | 10/2014 | Mirov | |
| 2005/0153713 A1 | 7/2005 | Sharony | |
| 2008/0091345 A1 | 4/2008 | Patel et al. | |
| 2008/0300748 A1 | 12/2008 | Drummy et al. | |
| 2009/0196267 A1 | 8/2009 | Walker, Sr. | |
| 2011/0300850 A1 | 12/2011 | Kuo et al. | |
| 2012/0143495 A1 | 6/2012 | Dantu | |

(Continued)

FOREIGN PATENT DOCUMENTS

| | | |
|---|---|---|
| EP | 2 615 420 A2 | 7/2013 |
| EP | 2 662 700 A2 | 11/2013 |
| WO | 2011065931 | 6/2011 |

OTHER PUBLICATIONS

International Search Report for PCT/US2014/013135 dated Apr. 9, 2014, 4 pages.

(Continued)

*Primary Examiner* — Kim T Nguyen
(74) *Attorney, Agent, or Firm* — Dority & Manning, P.A.

(57) ABSTRACT

A system and method are provided that allow for localization of a mobile device using detected magnetic signals and magnetic survey data. The magnetic signals may be produced by one or more magnetic signal sources, which are located at particular positions. The mobile device may be localized without information regarding the positions of the magnetic signal sources.

16 Claims, 6 Drawing Sheets

(56) References Cited

U.S. PATENT DOCUMENTS

| | | | |
|---|---|---|---|
| 2012/0232838 A1* | 9/2012 | Kemppi et al. | 702/150 |
| 2012/0245885 A1* | 9/2012 | Kimishima | 702/138 |
| 2013/0099927 A1 | 4/2013 | Kulinets et al. | |
| 2013/0179074 A1 | 7/2013 | Haverinen | |

OTHER PUBLICATIONS

Haverinen et al., "Global indoor self-localization based on the ambient magnetic field", Robotics and Autonomous Systems 57 (2009) 1028-1035.

Kim et al., "Indoor Positioning System Using Geomagnetic Anomalies for Smartphones", 2012 International Conference on Indoor Positioning and Indoor Navigation, New South Wales, Sydney, Australia, Nov. 13-15, 2012, 5 pages.

Vallivaara et al., "Magnetic field-based SLAM method for solving the localization problem in mobile robot floor-cleaning task", $15^{th}$ International Conference on Advanced Robotics, Tallinn, Estonia, Jun. 20-23, 2011, 198-203.

Kemppi et al., "Use of artificial magnetic anomalies in indoor pedestrian navigation", Vehicular Technology Conference Fall, 2010 IEEE $72^{nd}$, Ottawa, ON, CA, Sep. 6, 2010, 5 pages.

Electromagnetic Articulography—http://clas.mq.edu.au/physiology/ema/index.html—9 pages.

Burgard et al., "Integrating Global Position Estimation and Position Tracking for Mobile Robots: the Dynamic Markov Localization Approach", IEEE/RSJ International Conference on Intelligent Robots and Systems, vol. 3, Victoria, Canada, Oct. 17, 1998—6 pages.

Cheng et al., "Towards a Magnetic Localization System for 3-D Tracking of Tongue Movements in Speech-Language Therapy", IEEE Engineering in Medicine and Biology Society, Minneapolis, Minnesota, Sep. 3-6, 2009, pp. 563-566.

Dellaert et al., "Square Root SAM: Simultaneous Localization and Mapping via Square Root Information Smoothing", The International Journal of Robotics Research, vol. 25, No. 12, Dec. 2006, pp. 1181-1203.

Gozick et al., "Magnetic Maps for Indoor Navigation", IEEE Transactions on Instrumentation and Measurement, vol. 60, No. 12, Dec. 2011, 9 pages.

Grandi, "A Simple Method to Approximate the Magnetic Field in the Vicinity of Overhead Power Lines", 5th IASTED International Conference on Power and Energy Systems, Tampa, Florida, Nov. 19-22, 2001—6 pages.

Li et al., "Using Geomagnetic Field for Indoor Positioning", International Global Navigation Satellite Systems Society Symposium, Outrigger Gold Cost, Qld Australia, Jul. 16-18, 2013, 12 pages.

Mamishev et al., "Measurement of Magnetic Fields in the Direct Proximity of Power Line Conductors", IEEE Transactions on Power Delivery, vol. 10, Issue 3, Jul. 1995, pp. 1211-1216.

Moore et al., "Magnetic Localization for Perching UAVs on Powerlines", International Conference on Intelligent Robots and Systems, San Francisco, California, Sep. 25-30, 2011, 8 pages.

Moore et al., "Powerline Perching with a Fixed-Wing UAV", Proceedings of the AIAA Infotech Aerospace Conference, Seattle Washington, Apr. 7-9, 2009, 16 pages.

Morelli et al., "Hidden Markov Models for Radio Localization in Mixed LOS/NLOS Conditions", IEEE Transactions on Signal Processing, vol. 55, Issue 4, Apr. 2007, 1525-1542.

Subbu et al., "LocateMe: Magnetic Fields Based Indoor Localization Using Smartphones", ACM Transactions on Intelligent Systems and Technology, vol. 4, Issue 4, Sep. 2013, 27 pages.

The Viterbi Algorithm, Center for Intelligent Machines, cim.mcgill.ca, Dec. 3, 2013, 4 pages.

Juang, Biing-Hwang, "Hidden Martov Models", Encyclopedia of Telecommunications 2003, DOI: 10.1002/0471219282.eot114, John Wiley and Sons, Apr. 15, 2003, Abstract.

Rabiner et al., "An Introduction to Hidden Markov Models", iEEE ASSP Magazine, Jan. 1986, p. 4-16.

* cited by examiner

MOBILE DEVICE POSITION AND ORIENTATION FROM MULTIPLE UNSURVEYED MAGNETIC SOURCES

BACKGROUND

There are devices that use global positioning systems (GPS) to determine their current geographic location. However, GPS receivers typically rely on signals that are transmitted from satellites that orbit the Earth. Any obstruction in the line of sight to these satellites may prevent the GPS device from providing reliable location information. Accordingly, GPS is often not suitable for many environments, including indoor locations. In addition, many of the other existing solutions for localization within an obstructed environment do not provide accurate position and orientation information.

BRIEF SUMMARY

Embodiments relate to systems and methods for determining a position of a mobile device within various environments, including indoor environments. In particular, the mobile device may detect a magnetic signal having a signal bearing and a signal strength. The mobile device may also access a database containing magnetic survey data for the general area in which the mobile device is currently located. The magnetic survey data having been previously recorded by a mobile survey device. The accessed magnetic survey data may identify the strength and bearing of the magnetic field at a plurality of points throughout the general area of the mobile device. The mobile device may then compare the magnetic survey data with the received magnetic signal, so as to determine the mobile device's precise position and orientation within the general area.

In one embodiment, the magnetic signal is generated by a signal source, such as a magnetic beacon. The generated magnetic signal may be constant or may have a predetermined modulation frequency. The modulation may be of a low frequency so as to allow the signal to travel through structures, such as walls. The location of the signal source may be unknown to the mobile device.

In another embodiment, the magnetic survey data may include a two-dimensional or three-dimensional model of the magnetic field throughout a general area, such as within a specific building. In comparing a magnetic signal to the accessed survey data, the mobile device may determine whether the strength and bearing of the magnetic signal matches the strength and bearing of the magnetic field model at a particular location and orientation within the general area. If a match exists, position and orientation information corresponding to the location of the match may be used in connection with an application running on the mobile device.

In accordance with yet another embodiment, the mobile device may transmit data representing the detected magnetic signal to a remote server. The remote server may then compare the transmitted magnetic signal data to magnetic survey data in order to determine the mobile device's current position and orientation. The determined position and orientation of the mobile device may then be sent from the server to the mobile device.

DETAILED DESCRIPTION

Figure 1:
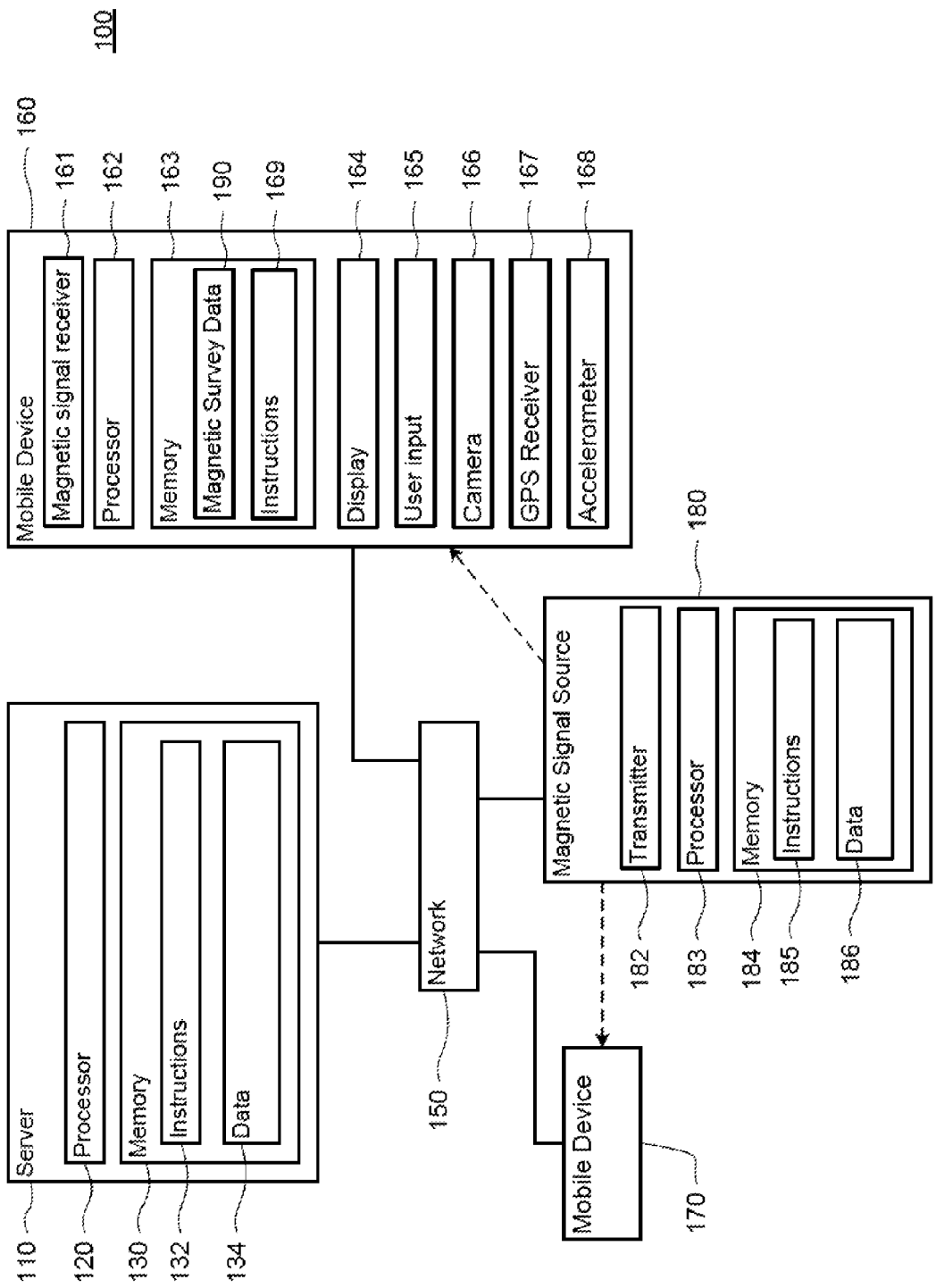
FIG. 1 is a functional diagram of a system in accordance with an aspect of the system and method.
Figure 2:
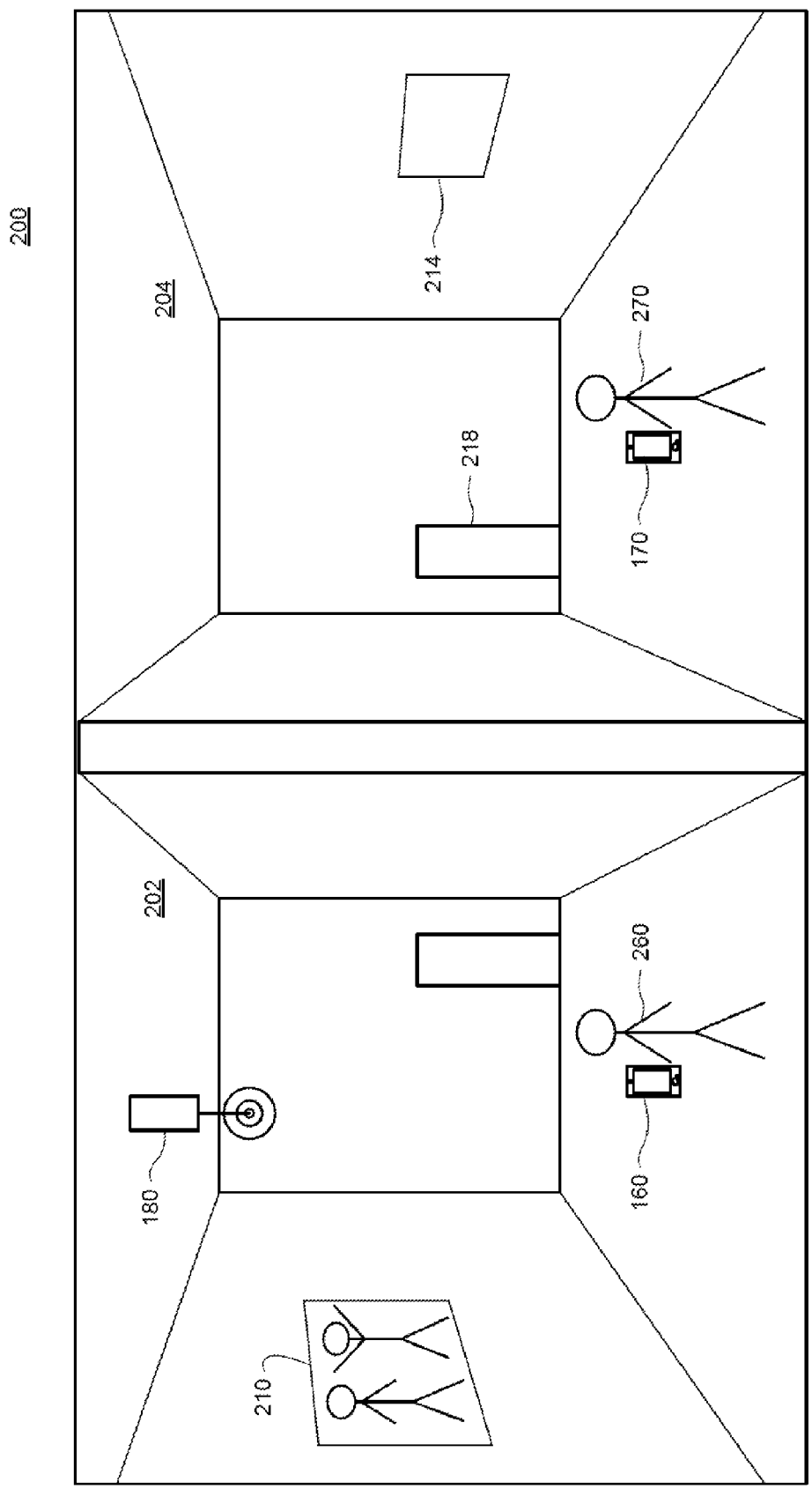
FIG. 2 illustrates a system in accordance with an aspect of the system and method.

The systems and methods set forth below allow for localization of a mobile device using detected magnetic signals and magnetic survey data. As shown in FIGS. 1-2, a system 100 in accordance with one embodiment includes a server 110, a magnetic signal source 180, and mobile devices 160 and 170. Server 110 may contain a processor 120, memory 130, and other components typically present in general purpose computers. The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional, general purpose processor. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

Server 110 may be at one node of a network 150 and capable of directly and indirectly communicating with other nodes of the network. For example, server 110 may comprise a web server that is capable of communicating with mobile devices 160 and 170 via network 150 such that server 110 uses network 150 to transmit and display information to a user on display 164 of mobile device 160. Server 110 may also comprise a plurality of computers that exchange information with different nodes of a network for the purpose of receiving, processing and transmitting data to the mobile devices. In this instance, the mobile devices will typically still be at different nodes of the network than any of the computers comprising server 110.

Network 150, and intervening nodes between server 110 and mobile devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each mobile device may be configured similarly to the server 110, with a processor, memory, and instructions, as described above. While FIG. 1 does not illustrate specific components for mobile device 170, it may include any of the components included in mobile device 160. Each mobile device 160 and 170 may be a mobile computing device intended for use by a person, and have all of the components normally used in connection with a personal computer such as a central processing unit (CPU) 162, memory 163 (e.g., RAM and internal hard drives) storing data 190 and instructions 169, an electronic display 164 (e.g., a monitor having a screen, a touch-screen, a projector, or any other electrical device that is operable to display information), end user input 165 (e.g., a mouse, keyboard, touch-screen, or microphone).

Each mobile device 160 and 170 may also include a magnetic signal receiver 122, such as a compass, that is capable of receiving a magnetic signal, and may be configured to determine the signal strength and bearing of the magnetic signal. The magnetic signal receiver 122 may include one or more magnetic sensors for detecting a magnetic field. For example, in one embodiment, a tri-axial magnetometer may be used.

In addition, the mobile devices 160 and 170 may include a GPS receiver 167, speakers, a camera 166, a network interface device, and all of the components used for connecting these elements to one another. By way of example, mobile devices 160 and 170 may be a wireless-enabled PDA or a cellular phone capable of obtaining information via the Internet. Computers in accordance with the disclosed systems and methods may comprise any device capable of processing instructions and transmitting data to and from humans and other computers including general purpose computers and network computers lacking local storage capability. In addition, mobile devices may be broadly defined to include any type of device that is mobile and has the ability to communicate, including devices such as robots, vehicles, or devices that can be worn by their users.

Mobile device 160 may also include GPS receiver 167 to determine the device's latitude, longitude and/or altitude position. The position component may also comprise software for determining the position of the device based on other signals received at the mobile device 160, such as signals detected at the magnetic signal receiver 161.

In accordance with one embodiment, magnetic signal source 180 may be configured similarly to the server 110, with a processor, memory and instructions as described above. In addition, signal source 180 includes a transmitter 182 for transmitting a magnetic signal. The magnetic signal may be the result of a constant magnetic field or a modulated magnetic field.

A modulated magnetic signal may be of a specific frequency. This frequency may be low so that the signals may propagate through structures, such as walls, before being received by mobile devices 160 and 170. For example, in one embodiment, signal source 180 may transmit a magnetic signal in the range of about 20 kHz to about 100 kHz. The signal may be unique to the area in which signal source 180 resides, so as to create a recognizable signal. For example, the signal may be given a particular frequency, or may be otherwise modulated, in order to make the generated signal unique. Signal source 180 may generate the desired magnetic signal using known modulation methods. For example, signal source 180 may spin a magnet at a known rate or may energize a coil with a controlled waveform in order to generate a particular magnetic field. The creation of the magnetic signal may be controlled by processor 183, which may itself be reprogrammed by communicating with server 110 through network 150.

Signal source 180 may be located anywhere, including the interior of a building. Signal source 180 may be placed at any position in or around a building, including on the ceiling, wall, or floor of the building. As seen in FIG. 2, signal source 180 is located on the ceiling of room 202 in building 200. The magnetic signal generated by signal source 180 may extend beyond the confines of room 202, as it may be detected in surrounding areas, such as room 204. For example, the magnetic signal generated by signal source 180 may be detected by mobile device 170 as it is used in room 204 by user 270. When multiple signal sources 180 are present in a building or room, they may be dispersed within the building so as to maximize the area in which the generated magnetic signals may be detected. Multiple signal sources 180 may also be arranged so as to produce a unique signal strength and signal bearing at each point within a room or building. Signal source 180 may also be located outdoors, either on its own or attached to a separate structure. In particular, signal sources 180 may be located in areas that are surrounded by GPS-signal obstructing objects.

The magnetic signal generated by signal source 180 will create a magnetic field in the surrounding area that will vary from one location to the next. In particular, the strength and bearing of the magnetic signal will depend on the location at which the magnetic signal is detected. Returning to FIG. 2, signal source 180 may generate a magnetic signal that travels throughout rooms 202 and 204. However, the magnetic signal will have a different bearing and strength in room 202 than in room 204. Therefore, mobile devices 160 and 170 will each detect magnetic signals of differing strength and bearing. In addition, as users 260 and 270 move within rooms 202 and 204, respectively, both mobile devices 160 and 170 will detect a change in the strength and bearing of the detected magnetic signal. The mobile devices may detect changes in the magnetic signal strength that are less than a picotesla.

In accordance with one embodiment, mobile device 160 may access data regarding the magnetic environment in which mobile device 160 currently resides. For example, mobile device 160 may access previously recorded magnetic survey data that represents the strength and bearing of the magnetic field at various locations within building 200. The accessed survey data may then be compared to the magnetic signal that is currently being detected by mobile device 160. In particular, mobile device 160 may match the strength and bearing of the currently detected magnetic signal with the strength and bearing data represented in the accessed survey data. Mobile device 160 may then use location information contained in the survey data to determine the likely location of the mobile device 160.

While the detected magnetic signal may be based on a signal generated by a signal source 180, the detected magnetic signal may also be based on the natural magnetic environment, provided that a spatially varying magnetic field exists in the area of interest. A natural magnetic environment includes any environment where the detected magnetic signal is not primarily the result of a device, such as signal source 180, which has the purpose of creating a magnetic signal. For example, a building may interact with the Earth's magnetic field so as to create a natural magnetic signal within that building. This natural magnetic signal may be detected by mobile device 160 and used in connection with the embodiments described herein.

As seen in FIG. 1, the magnetic survey data accessed by mobile device 160 could be stored locally as survey data 190. Alternatively, the survey data may be stored remotely at server 110 or at magnetic signal source 180. Mobile device 160 may the request and receive the remotely stored survey data over network 150.

In accordance with one embodiment, the magnetic survey data that is accessed by mobile device 160 has been previously collected using a survey device. This survey device may itself be a mobile device, such as mobile devices 160 or 170, which have previously been taken throughout a target area so as to collect survey data for the area's magnetic field. For example, returning to FIG. 2, user 270 may walk around building 200 while mobile device 170 detects the area's magnetic field. As mobile device 170 travels throughout building 200, it may store data indicating the strength and bearing of the detected magnetic field at various locations and orientation within building 200.

While collecting the magnetic survey data, the current location of mobile device 170 may be determined in any number of ways. For example, user 270 may manually input the current location of mobile device 170, which may be acquired using known surveying techniques. The user may also manually input the position of mobile device 170 relative to other objects, such as by inputting data into mobile device 170 indicating that the mobile device is in room 204 and further indicating the relative position of mobile device 170 with respect to door 218 and window 214. In addition, the location of mobile device 170 may be determined using other known methods, such as acquiring the geographic coordinates of mobile device 170 via GPS or through WiFi positioning. The surveying of an area may occur at designated locations within an area, with each measurement of the magnetic field being separated by a predetermined distance. For example, user 270 may take a measurement of the magnetic field produced by signal source 180 at least once every several feet throughout rooms 202 and 204.

As set forth above, the magnetic signal generated by signal source 180 may have a specific frequency at which the signal modulates. Accordingly, the survey data collected by mobile device 170 may also include data identifying the frequency at which the detected magnetic field is modulating.

Once the magnetic survey data has been collected by mobile device 170, it may be stored locally or sent to server 110 via network 150. In accordance with one embodiment, the survey data may then be used to create a model that indicates the strength and bearing of the magnetic field throughout the surveyed area. This model may include a two-dimensional or three-dimensional map of the surveyed area that indicates the strength and bearing of the magnetic signals at various locations, as well as the frequency at which the signals are modulating. In addition, the model may extrapolate what the strength and bearing of the magnetic field is likely to be at non-surveyed points by assuming continuity of the magnetic field between nearby surveyed points. For example, survey data may exist for two points that are several feet from one another, with each point having a slightly different signal strength and bearing. In generating the model, server 110 may assume a gradual shift in the magnetic field between the two surveyed points, and thereby approximate the magnetic field for all points in between the surveyed points. The same extrapolation may be performed for all points between each of the surveyed points. In this way, the model may contain data for all locations within a given area without the need for measuring the magnetic field at each location.

All of the surveyed points for a specific area may be along a similar plane. For example, each surveyed point may be taken around the same height above street level. In this instance a two-dimensional model of the magnetic field may be created. However, the surveyed points may also be taken in three-dimensional space. For example, If building 200 is a multi-story building, measurements of the magnetic field created by signal source 180 may be taken at each story of the building or measurements may be taken at different heights above the floor of rooms 202 and 204. In this instance, a three-dimensional model of the magnetic field within building 200 may be created.

This model may be generated locally on mobile device 170 or may be generated at server 110 based on survey data that has been provided by mobile device 170. In addition, the model may be created using survey data that has been collected from multiple survey devices and combined at server 110 to create a composite model of the magnetic field within the designated area.

Figure 3:
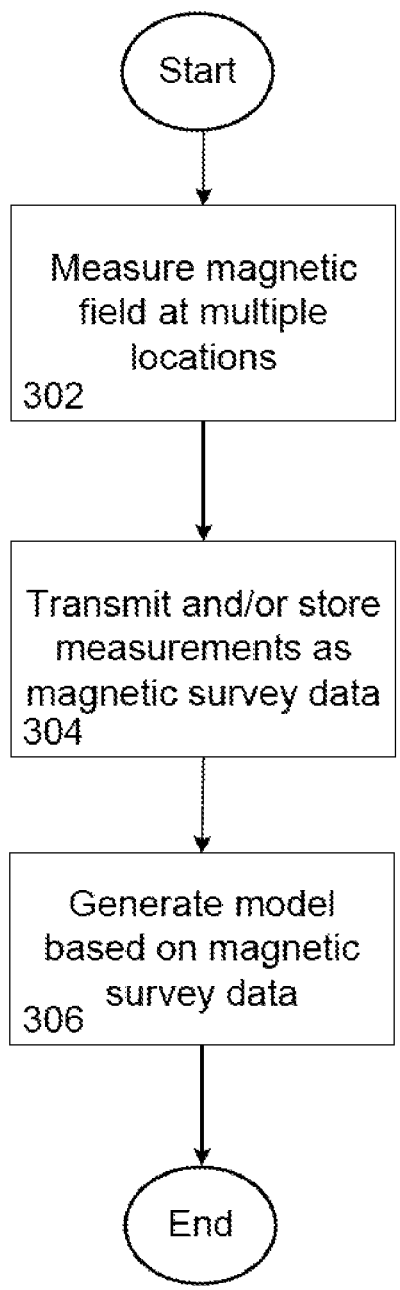
FIG. 3 is a flow chart in accordance with an aspect of the method for collecting magnetic survey data.

FIG. 3 provides an exemplary flowchart 300 for creating a model of the magnetic field for a particular area. In Block 302, a survey device measures a magnetic field at multiple locations. As set forth above, the measured magnetic field may be the result of a magnetic signal generated by a magnetic signal source or may be the result of the natural magnetic properties of the environment. The measurements may include the strength and bearing of the magnetic field, as well as the frequency at which the field is modulating, at each of the surveyed locations. These measurements may then be stored as magnetic survey data, which identifies the location at which each measurement was taken (Block 304). As noted in Block 304, the measurements may be both transmitted and stored. For example, the survey device may transmit magnetic field measurements and location data to a remote server, where it is stored as survey data. As provided in Block 306, a model may then be created based on the magnetic survey data. This model may be created locally at the survey device or at the remote server. As noted above, the model may represent a multi-dimensional map of the magnetic field throughout a particular area. The model may also be based on additional survey data that has been provided by multiple survey devices. As discussed above, the model may extrapolate the likely attributes of the magnetic field at non-surveyed points.

Figure 4:
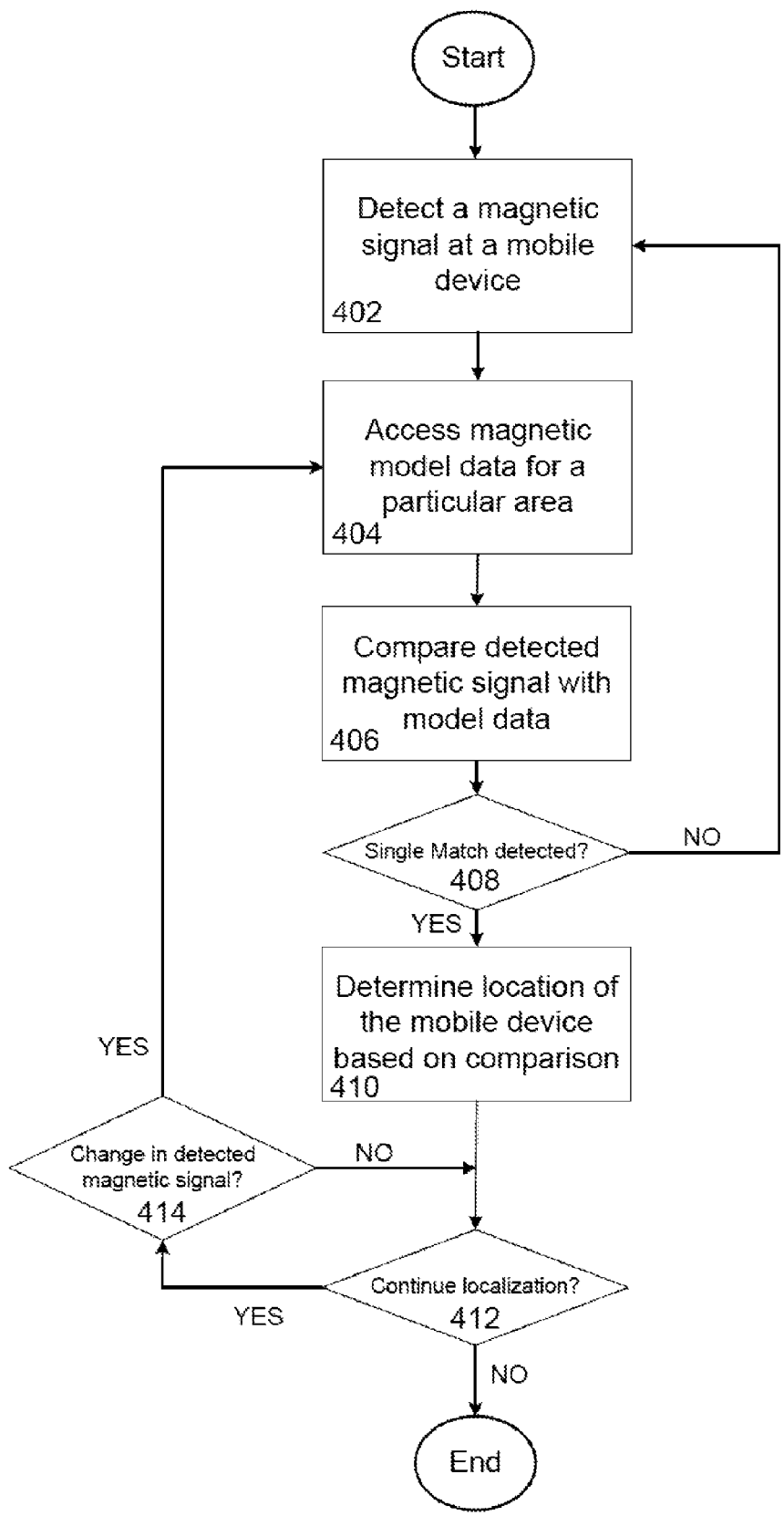
FIG. 4 is a flow chart in accordance with an aspect of the method for determining the position of a mobile device.

FIG. 4 provides an exemplary flowchart 400 for performing localization of a mobile device based on a detected magnetic signal. In Block 402, a mobile device detects a magnetic signal. As provided above, the magnetic signal may be based on the natural magnetic properties of the environment, or may be based on a magnetic signal that is generated by a signal source. In addition, the detection may include measuring the strength, bearing, and frequency of the magnetic signal. The mobile device may then access magnetic survey data for the general area in which the mobile device is currently located (Block 404). If the detected magnetic signal has a specific frequency, that frequency may be used to identify the model data to be accessed. For example, mobile device 160 of FIG. 2, may access stored magnetic model data for building 200 based on the frequency of the magnetic signal generated by signal source 180. Alternatively, the mobile device may access particular magnetic model data based on general location information acquired by the mobile device. This general location may be acquired in any number of ways, such as by being manually provided by the user, or by using the last GPS signal that was received by the mobile device. The mobile device may then compare the accessed model data with the detected magnetic signal (Block 406). Specifically, the mobile device may determine whether the strength and bearing of the detected magnetic signal matches the same attributes of the modeled magnetic field at a particular location within the accessed model (Block 408). If a match exists, then the mobile device may then determine that its absolute location and/or orientation correspond to the location in the model at which the match occurs (Block 410).

It is possible that no match exists between the model data and the detected magnetic signal, or that multiple potential matches exist. If no single match exists, the mobile device may return to Block 402 by detecting a magnetic signal again and repeating Blocks 404 and 406 using the newly detected magnetic signal, as well as any previously detected magnetic signals, to determine the mobile device's current location and orientation (Block 410). Once a location has been determined in Block 410, the mobile device may continue to may perform the localization method until it is instructed to stop (Block 412). In particular, the mobile device may determine whether there is a change in the strength, bearing, or frequency of the detected magnetic signal (Block 414). If such a change is detected, mobile device may repeat the actions associated with Blocks 404, 406, 408, and 410 using the newly detected magnetic signal.

In accordance with flowchart 400, mobile device 160 of FIG. 2 may localize itself using the features of the magnetic environment within building 200. This localization may occur even if mobile device 160 is not provided with information indicating the location of signal source 180, as the absolute position of mobile device 160 may be identified using the accessed magnetic survey data.

Many of the functions described above as being performed by a mobile device may alternatively be performed by a remote server, and vice versa. For example, in one embodiment, the detected magnetic signal from Blocks 402 and 414 may be transmitted from the mobile device to a remote server, such as server 110. Blocks 404, 406, 408, and 410 may then be performed on the remote server, and the remote server may then transmit the determined location and or/orientation data to the mobile device. In addition, while flowcharts 300 and 400 contain a specific set of actions, these actions are only exemplary. Alternative embodiments of the disclosed system may perform additional actions from those shown in FIGS. 3 and 4, or may perform only a portion of the actions shown.

Figure 5:
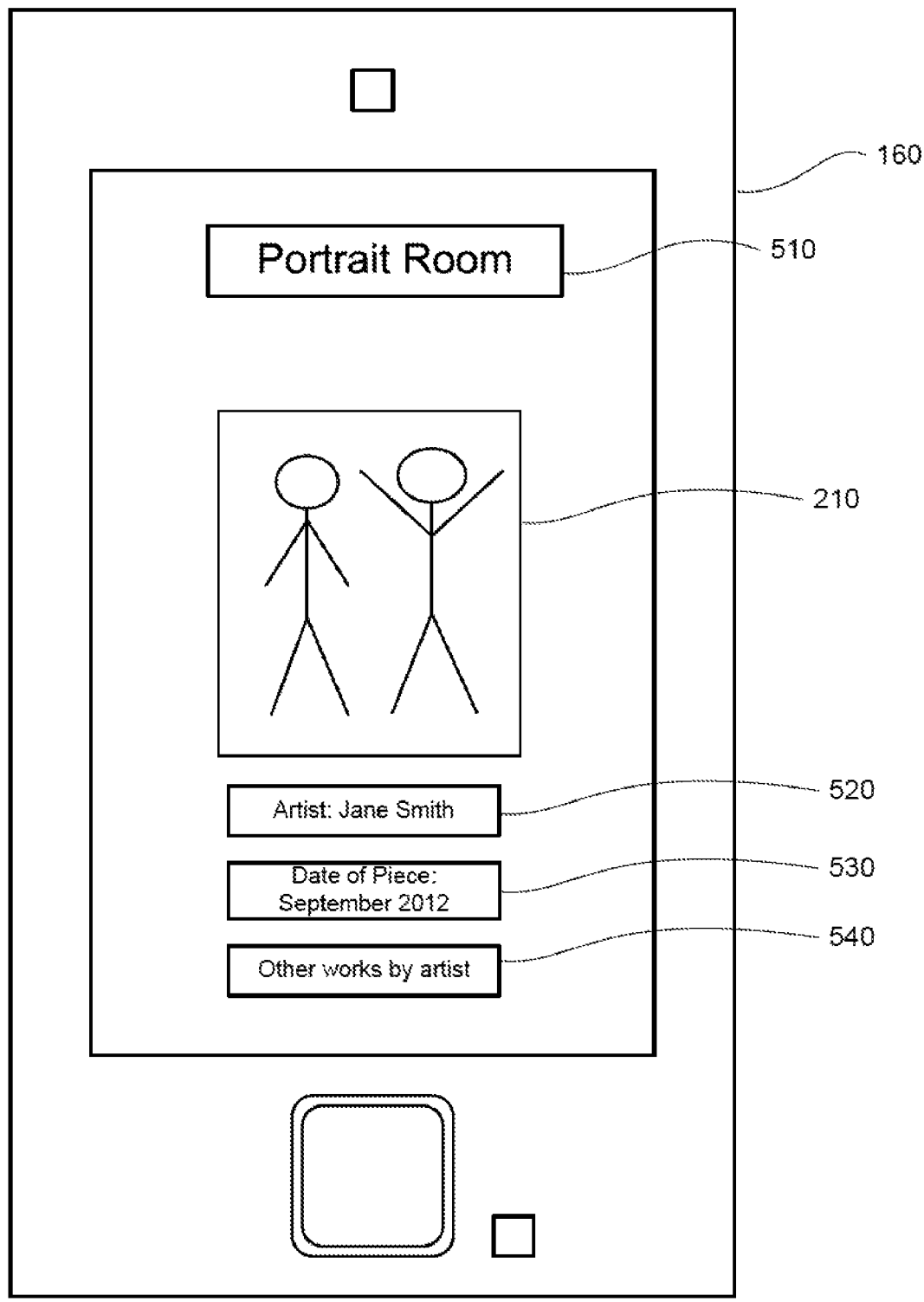
FIG. 5 is a mobile device display in accordance with an aspect of the system and method.

Returning to FIG. 2, mobile device 160 may localize itself, using the methods described above. This localization of mobile device 160 may be performed automatically in connection with one or more applications currently running on mobile device 160. For example, building 200 may be an art museum, and user 260 may access an application on mobile device 160 that provides information about the works of art in the vicinity of user 260. As user 260 approaches painting 210, mobile device 210 may use the localization methods described above to determine that mobile device 160 is at predetermined distance and orientation with respect to painting 210. Mobile device may then automatically display information about painting 210, as shown in FIG. 5. In accordance with the application, mobile device 160 may display an icon 510 that identifies the room in which user 260 is currently located. In addition, mobile device may display selectable icons 520, 530, and 540, each of which provides additional information about painting 210. Mobile device 160 may also perform a similar identifying function in connection with rooms or establishments in proximity to mobile device 160.

Figure 6:
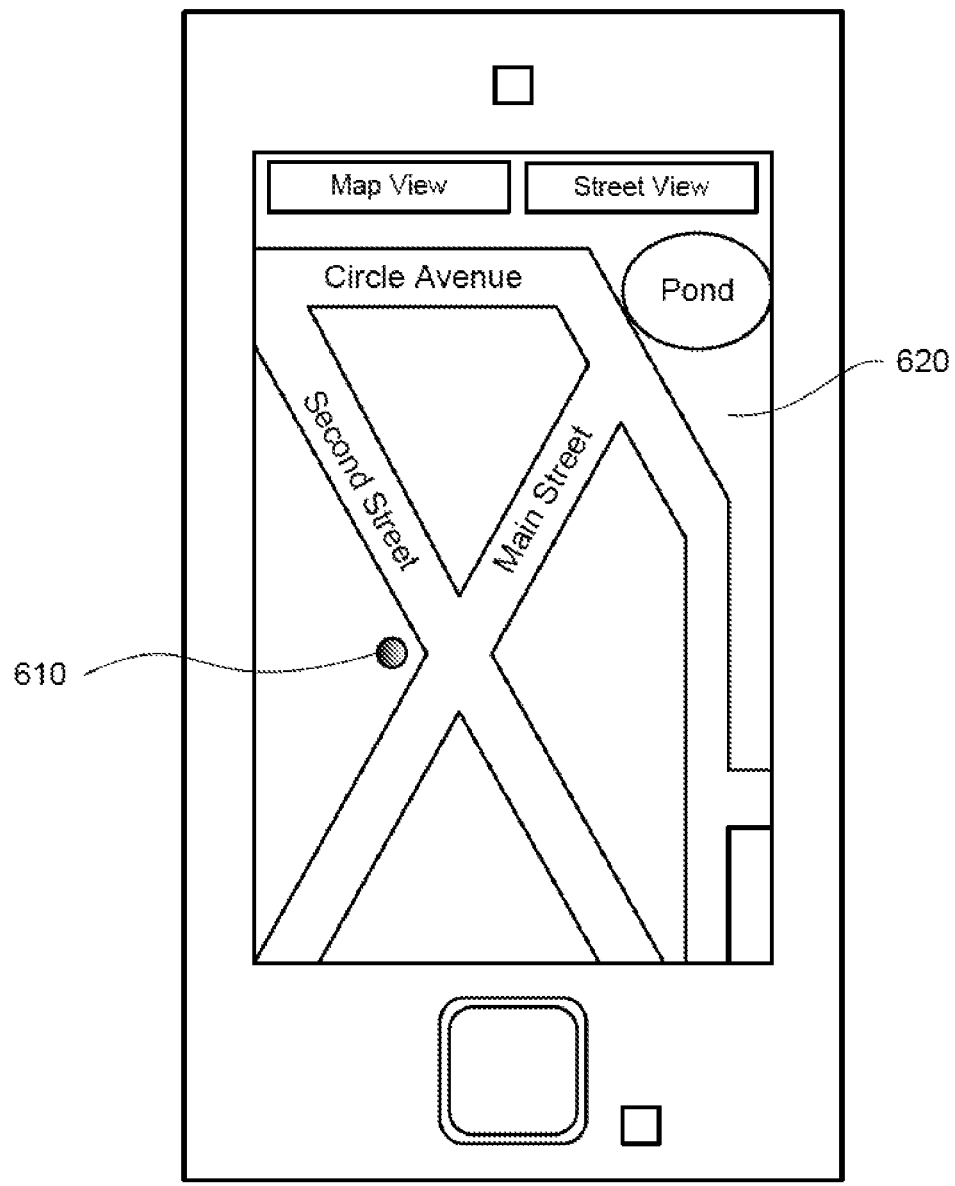
FIG. 6 is a map display in accordance with an aspect of the system and method.

In another embodiment, mobile device 160 may use the above described methods to determine the user's current location in connection with a map application. As shown in FIG. 6, mobile device 160 may display object 610 as indicating the user's current location on map 620. This location may be determined solely by comparing detected magnetic signals to magnetic survey data, or in combination with other localization techniques, such as GPS. In addition, the map may show the layout of a building and indicate the user's location within the building.

The magnetic survey data 190 stored on mobile devices 160 may be updated by server 110 based on changes in the magnetic environment over time. Likewise, the magnetic signals detected by mobile devices 160 and 170 may be used to update the magnetic survey data stored on remote server 110.

As these and other variations and combinations of the features discussed above can be utilized without departing from the claimed subject matter, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:
1. A method comprising:
   receiving, at a mobile device, a magnetic signal from a non-natural signal source, the magnetic signal having a signal bearing and signal strength;
   accessing magnetic survey data relating to previously recorded attributes of a magnetic field at a plurality of locations, the previously recorded attributes of the magnetic field being based on one or more previously transmitted magnetic signals from the non-natural signal source;
   comparing the previously recorded attributes of the magnetic field with the signal bearing and the signal strength of the magnetic signal;
   determining, with a processor, a position of the mobile device based on the comparing step; and receiving for display, at the mobile device location-specific content associated with one or more objects located in proximity to the determined position of the mobile device.

2. The method of claim 1, wherein the mobile device is not provided with a location of the signal source.

3. The method of claim 1, wherein the magnetic signal comprises a low-frequency modulated magnetic signal.

4. The method of claim 1, wherein determining the position of the mobile device includes determining an absolute position and an orientation of the mobile device.

5. The method of claim 1, wherein the magnetic survey data includes a multi-dimensional model of the magnetic field.

6. The method of claim 1, wherein:
the previously recorded attributes of the magnetic field include a field bearing and a field strength at each of the plurality of locations; and
comparing the magnetic survey data with the magnetic signal comprises matching the signal bearing and the signal strength of the magnetic signal with the field bearing and the field strength of the magnetic field at one of the plurality of locations.

7. The method of claim 1 wherein:
the previously recorded attributes of the magnetic field include a field bearing and a field strength at each of the plurality of locations; and
the field bearing and the field strength at the plurality of locations are recorded using a. mobile survey device.

8. The method of claim 1, wherein the magnetic survey data is accessed on a server that remote from the mobile device.

9. The method of claim 1, wherein the location-specific content is received at the mobile device when the determined position of the mobile device is within a predetermined distance of a known location of an object of the one or more objects.

10. The method of claim 1, wherein the non-natural signal source includes a processor, a memory and a transmitter device, the transmitter device being configured to transmit the magnetic signal across the plurality of locations.

11. A system comprising:
a detection device for receiving a magnetic signal having a signal bearing and signal strength, the magnetic signal deriving from a non-natural signal source;
a memory for storing magnetic survey data relating to previously recorded attributes of a magnetic field at a plurality of locations, the previously recorded attributes of the magnetic field being based on one or more previously transmitted magnetic signals non-natural signal source;
a processor in communication with the detection device and the memory, the processor being configured to:
perform a comparison of the previously recorded attributes of the magnetic field with the signal bearing and the signal strength of the magnetic signal;
determine a position of the detection device based on the performed comparison;
compare the determined position of the detection device to a known location of an object located in proximity to the determined position; and
provide for display location-specific content associated with the object when the determined position of the detection device is within a predetermined distance of the known location of the object.

12. The system of claim 11 wherein the position of the detection device comprises an absolute position and orientation of the detection device.

13. The system of claim 11, wherein the magnetic survey data includes a multi-dimensional model of the magnetic field.

14. A method comprising:
receiving magnetic survey data for a plurality of locations, wherein the survey data indicates a magnetic field attribute at each of the plurality of locations, the magnetic field attribute being based on one or more previously transmitted magnetic signal from a non-natural signal source;
storing the magnetic survey data;
receiving signal data indicating a magnetic signal attribute, the signal data deriving from the non-natural signal source;
comparing the magnetic field attribute for one or more of the plurality of locations with the magnetic signal attribute;
based on the comparing step, determining, with a processor, a position for which the signal data corresponds; and
transmitting position data associated with the determined position, the position data including location-specific content associated with one or more objects located in proximity to the determined position.

15. The method of claim 14 wherein the position is an absolute position and orientation.

16. The method of claim 14 wherein:
the magnetic survey data is collected by a first mobile device at a first period of time; and
the signal data is collected by a second mobile device at a second period of time.

* * * * *